US012603593B2

(12) United States Patent
Hayashi et al.

(10) Patent No.: US 12,603,593 B2
(45) Date of Patent: Apr. 14, 2026

(54) MOTOR CONTROL DEVICE

(71) Applicant: TOYOTA JIDOSHA KABUSHIKI KAISHA, Toyota (JP)

(72) Inventors: Kazuhito Hayashi, Toyota (JP);
Kohichi Kuriyama, Hashima (JP);
Kojiro Asakawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 18/491,164

(22) Filed: Oct. 20, 2023

(65) Prior Publication Data

US 2024/0283381 A1    Aug. 22, 2024

(30) Foreign Application Priority Data

Feb. 21, 2023    (JP) ................................. 2023-025121

(51) Int. Cl.
*H02P 6/10* (2006.01)
*H02P 21/22* (2016.01)
*H02P 27/06* (2006.01)

(52) U.S. Cl.
CPC .............. *H02P 21/22* (2016.02); *H02P 27/06* (2013.01)

(58) Field of Classification Search
CPC ............ H02P 21/22; H02P 27/06; H02P 6/10; H02M 7/155; H02K 37/14
See application file for complete search history.

(56) References Cited

U.S. PATENT DOCUMENTS

| | | | | |
|---|---|---|---|---|
| 2012/0038301 A1* | 2/2012 | Iwasaki | .................. | H02K 37/14 |
| | | | | 318/400.23 |
| 2013/0335041 A1* | 12/2013 | Baek | ..................... | H02M 7/155 |
| | | | | 322/89 |
| 2014/0354204 A1* | 12/2014 | Tachibana | ................. | H02P 6/10 |
| | | | | 318/473 |
| 2023/0291341 A1* | 9/2023 | Shimada | ................. | H02P 21/05 |

FOREIGN PATENT DOCUMENTS

| | | |
|---|---|---|
| JP | 2005-278350 A | 10/2005 |
| JP | 2020-167921 A | 10/2020 |
| WO | 2013/164930 A1 | 11/2013 |
| WO | 2022/054232 A1 | 3/2022 |

* cited by examiner

*Primary Examiner* — Cortez M Cook
(74) *Attorney, Agent, or Firm* — SoraIP, Inc.

(57) ABSTRACT

The motor control device includes an inverter that generates a three-phase alternating current for driving the motor, a current command generation unit, a correction value generation unit, a voltage command generation unit, a dq inverse transform unit, and a drive signal generation unit. The current command generation unit generates a d-axis current command value and a q-axis current command value. The correction value generation unit generates a d-axis correction value and a q-axis correction value that suppress sixth-order noise. The voltage command generation unit generates a d-axis voltage command value and a q-axis voltage command value. The dq inverse transform unit generates three-phase voltage command values. The drive signal generation unit generates a drive signal for the inverter.

4 Claims, 4 Drawing Sheets

FIG. 2

MOTOR CONTROL DEVICE

CROSS-REFERENCE TO RELATED APPLICATION

This application claims priority to Japanese Patent Application No. 2023-025121 filed on Feb. 21, 2023, incorporated herein by reference in its entirety.

BACKGROUND

1. Technical Field

The technology disclosed in this specification relates to a motor control device that drives a three-phase alternating current (AC) motor.

2. Description of Related Art

It is known that when a three-phase AC motor is driven, noise with a frequency six times as high as the rotational frequency (electrical angle conversion) of the motor (rotor) is generated (WO2022/054232). Note that the electrical angle conversion value of the rotation frequency refers to the frequency at which the electrical angle changes when the motor rotates. As is well known, there is a relationship between the mechanical angle and the electrical angle of the motor as follows: electrical angle=mechanical angle×Pn/2 (where Pn is the number of poles of the motor). For convenience of explanation, noise having a frequency six times as high as the rotation frequency (electrical angle conversion) of the motor (rotor) is hereinafter referred to as sixth-order noise. WO2022/054232 discloses a technique for suppressing sixth-order noise by adding a torque correction value according to the rotation angle of the rotor to the torque command value.

SUMMARY

The present specification provides a motor control device that reduces sixth order noise with a different approach than the technique of WO2022/054232.

The motor control device disclosed in this specification includes: an inverter that produces three-phase alternating current to drive a motor; a current command generation unit; a correction value generation unit; a voltage command generation unit; a dq inverse transform unit; and a drive signal generation unit.

The current command generation unit generates a d-axis current command value and a q-axis current command value from a target torque of the motor. The correction value generation unit generates a d-axis correction value and a q-axis correction value that suppress noise (sixth-order noise) having a frequency six times as high as a frequency of change in an electrical angle of the motor, based on the target torque and the electrical angle. The voltage command generation unit generates a d-axis voltage command value based on a d-axis current correction command value obtained by adding the d-axis correction value to the d-axis current command value. The voltage command generation unit generates a q-axis voltage command value based on a q-axis current correction command value obtained by adding the q-axis correction value to the q-axis current command value. The dq inverse transform unit generates voltage command values for respective three phases from the d-axis voltage command value and the q-axis voltage command value. The drive signal generation unit generates a drive signal of the inverter from the voltage command values for the respective three phases. The technique described above can reduce the sixth-order noise.

The voltage command generation unit may further generate the d-axis voltage command value based on a difference between the d-axis current correction command value and a d-axis current of the motor, and generate the q-axis voltage command value based on a difference between the q-axis current correction command value and a q-axis current of the motor. The d(q)-axis voltage command value is the sum of the feedforward term (FF term) and the feedback term (FB term). In the voltage command value, the portion generated based on the d(q)-axis current correction command value without using the difference corresponds to the FF term, and the portion generated based on the difference corresponds to the FB term. Generating the d(q)-axis voltage command value with the FF term and the FB term allows the output torque of the motor to well follow the target torque while suppressing the sixth-order noise.

The voltage command generation unit may generate the d-axis voltage command value using time differentiation of the d-axis current correction command value, and generate the q-axis voltage command value using time differentiation of the q-axis current correction command value. The use of time differentiation improves the responsiveness of the effect of suppressing the sixth-order noise. In other words, the sixth-order noise can be suppressed up to a higher motor rotation range.

An example of each of the d-axis correction value and the q-axis correction value is given as a function of the electrical angle. By determining the correction value in this way, the d(q)-axis correction value becomes a simple function of the electrical angle, and the arithmetic processing for creating the correction value can be performed at high speed. As a result, the sixth-order noise can be suppressed more effectively. In addition, the calculation of the time differentiation of the d(q)-axis current correction command value is simplified.

The correction value generation unit may generate the d-axis correction value and the q-axis correction value based on an angle obtained by adding a predetermined delay angle to the electrical angle. The delay angle may be $\pi \times Tc/Te$. Here, $\pi$ is a circular constant, Tc is a control cycle of the motor control device, and Te is a cycle of change in the electrical angle. It is possible to compensate for a delay associated with the control cycle of the motor control device.

Details of the techniques disclosed in the present specification and further modifications will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a functional block diagram of the computer of the motor control device;

DETAILED DESCRIPTION OF EMBODIMENTS

Figure 1:
FIG. 1 is a block diagram of a drive system of a battery electric vehicle equipped with a motor control device of an embodiment.
Figure 1:
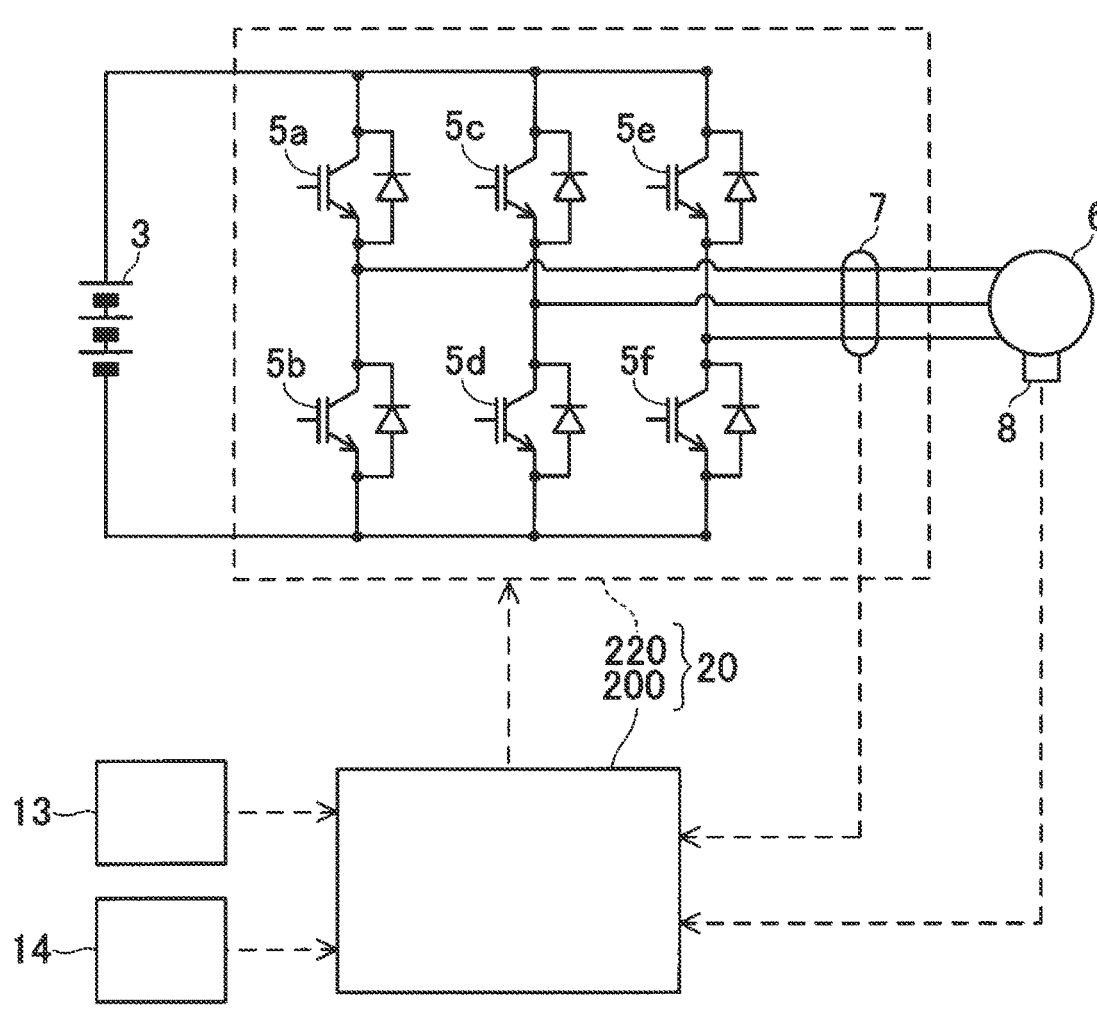

A motor control device 20 of an embodiment will be described with reference to the drawings. A motor control device 20 is mounted on the battery electric vehicle 2. FIG. 1 shows a block diagram of the drive system of the battery electric vehicle 2. The battery electric vehicle 2 includes a motor control device 20, a power supply 3, and a motor 6 for running. The motor 6 is an Interior Permanent Magnet Synchronous Motor (IPMSM) and is also a three-phase AC motor. The motor control device 20 includes computer 200 and inverter 220.

The power supply 3 is a lithium-ion battery, and can output power with a voltage of 100 volts or more. The output power (direct current power) of the power supply 3 is converted into AC power by the inverter 220 and supplied to the motor 6. Between the power supply 3 and the inverter 220, a capacitor, a relay, a current sensor, a voltage sensor, and the like for suppressing current (voltage) pulsation are provided, but they are omitted from the drawing.

Inverter 220 comprises six switching elements 5a-5f. The six switching elements 5a-5f are connected in series two by two. Three sets of series-connected circuits are connected in parallel. A diode is connected in anti-parallel to each of the switching elements 5a-5f. Computer 200 controls inverter 220 so that the output of motor 6 follows the target torque. A voltage converter may be connected between power supply 3 and inverter 220.

Inverter 220 includes current sensor 7. Current sensor 7 measures the current of each phase of the three-phase alternating current flowing between inverter 220 and motor 6. A measurement value of the current sensor 7 is sent to the computer 200.

The computer 200 acquires the vehicle speed from the vehicle speed sensor 13 and acquires the accelerator operation amount from the accelerator sensor 14. The motor 6 is provided with an angle sensor 8, and the computer 200 obtains the mechanical angle and number of rotations (angular velocity of mechanical angle change) of the motor 6 from the measurement data of the angle sensor 8. Since the number of poles of the motor 6 is known, the electrical angle of the motor 6 and its changing speed can be calculated from the mechanical angle and the rotation speed of the motor 6.

The computer 200 calculates the target torque of the motor 6 based on the measured values of the vehicle speed sensor 13 and the accelerator sensor 14, and controls the inverter 220 so that the output torque of the motor 6 follows the target torque. Computer 200 generates drive signals for switching elements 5a-5f of inverter 220 from the target torque. The computer 200 performs feedback control using the measured value of the current sensor 7 so that the output torque of the motor 6 follows the target torque.

Figure 2:
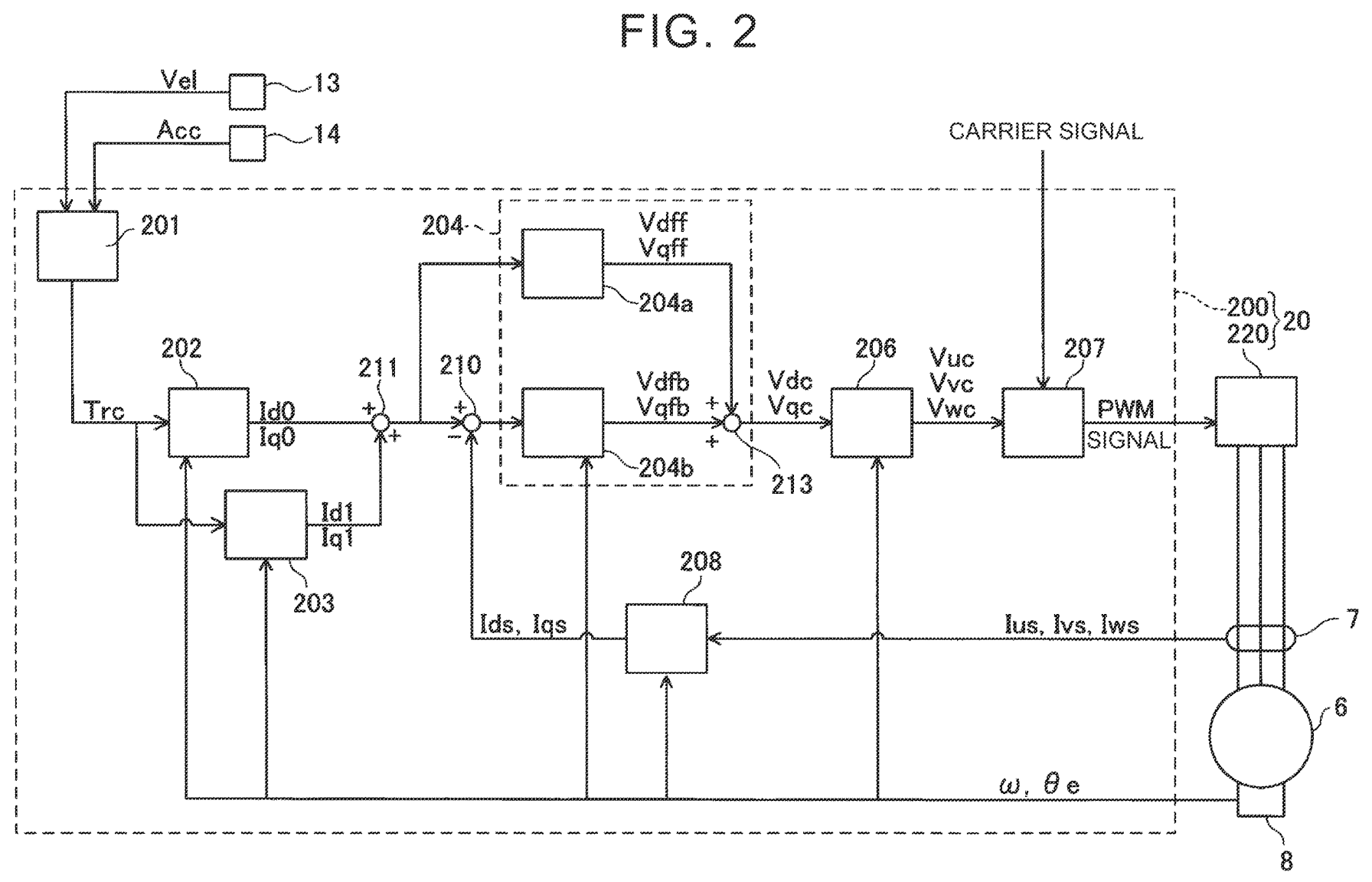

FIG. 2 shows a functional block diagram of motor control executed by the computer 200. FIG. 2 shows programs executed by the computer 200 by function. The program of the computer 200 is divided into, by function, a target torque generation unit 201, a current command generation unit 202, a correction value generation unit 203, a voltage command generation unit 204, a dq inverse transform unit 206, a drive signal generation unit 207, a dq transform unit 208, a difference calculator 210, and adders 211 and 213.

The vehicle speed Ve1 measured by the vehicle speed sensor 13 and the accelerator operation amount Acc measured by the accelerator sensor 14 are input to the target torque generation unit 201. A target torque generation unit 201 determines a target torque Tre for the motor 6 from the vehicle speed Ve1 and the accelerator operation amount Acc. The memory of the computer stores a map (or a relational expression) that defines the relationship between the vehicle speed Ve1, the accelerator operation amount Acc, and the target torque Trc. The target torque generation unit 201 determines a target torque Trc from the measured vehicle speed Ve1 and the accelerator operation amount Acc.

Target torque Tre is sent to a current command generation unit 202. The current command generation unit 202 generates a d-axis current command value Id0 and a q-axis current command value Iq0 for the motor 6 (inverter 220) from the target torque Trc. Since the relational expressions for generating the d-axis current command value Id0 and the q-axis current command value Iq0 from the target torque Tre are well known, the description is omitted.

As mentioned earlier, the motor 6 is an Interior Permanent Magnet Synchronous Motor (IPMSM). In the IPMSM motor, it is known that the relationship of (Equation 1) holds between the d-axis current Id, the q-axis current Iq, and the V-axis voltage Vd, the q-axis voltage Vq. In (Equation 1), the symbol R represents the electric resistance of the stator coil of the motor 6. The symbol ω represents the angular velocity of the rotor of the motor 6. More precisely, the angular velocity of the rotor means the time change of the electrical angle of the rotor. Symbols Ld and Lq represent the d-axis inductance and the q-axis inductance of the rotor. The symbol Φ represents the strength of the magnetic field of the permanent magnets of the rotor. The electrical resistance R, inductances Ld, Lq, and magnetic field strength Φ are known constants. The angular velocity ω of the motor 6 (rotor) is obtained from the measured value of the angle sensor 8. The d-axis current Id and the q-axis current Iq are obtained by dq-converting each phase value of the three-phase alternating current flowing through the motor 6.

$$Vd = R \times Id + Ld\frac{dId}{dt} - \omega \times Lq \times Iq \qquad \text{(Equation 1)}$$

$$Vq = R \times Iq + Lq\frac{dIq}{dt} + \omega \times Ld \times Id + \omega \times \Phi$$

A typical feedforward type motor control is as follows. The d-axis current command value Id0 and the q-axis current command value Iq0 obtained from the target torque Trc are substituted into (Equation 1) to obtain the d-axis voltage command value Vdff and the q-axis voltage command value Vqff. The d-axis voltage command value Vdff and the q-axis voltage command value Vqff are subjected to dq inverse transformation to obtain three-phase voltage command values Vuc, Vvc, and Vwc. Each of the three-phase voltage command values Vuc, Vvc, and Vwc is compared with the carrier signal to generate drive signals (PWM signals) for the inverters (switching elements). When the generated drive signal (PWM signal) is given to the inverter (switching element), the motor outputs (a torque close to) the target torque Trc.

A typical feedback type motor control is as follows. As described above, the d-axis current command value Id0 and the q-axis current command value Iq0 are obtained from the target torque Trc. Current sensors obtain three-phase currents Ius, Ivs, and Iws flowing through the motor. The computer 200 obtains a d-axis current Ids and a q-axis current Iqs by dq-converting the three-phase currents Ius, Ivs, and Iws. Based on general control measurements such as proportional-integral control (PI control) and proportional-integral-derivative control (PID control), the difference between the d-axis current command value Id0 and the d-axis current Ids (Id0–Ids), the d-axis voltage command value Vdfb and the q-axis voltage command value Vqfb are obtained from the difference (Iq0–Iqs) between the q-axis current command value Iq0 and the q-axis current Iqs. The rest is the same as in feedforward motor control.

By generating a drive signal from the total value of the voltage command values Vdff and Vqff for feedforward control and the voltage command values Vdfb and Vqfb for feedback control, the target torque Tre can be quickly followed and motor control with a small error can be realized. When feedback and feedforward are used together, the second term (current time differential term) on the right side of (Equation 1) may be omitted. The difference between the target torque and the output torque when the time differential term of the current is deleted is reduced by the feedback term.

Figures 3, 4:
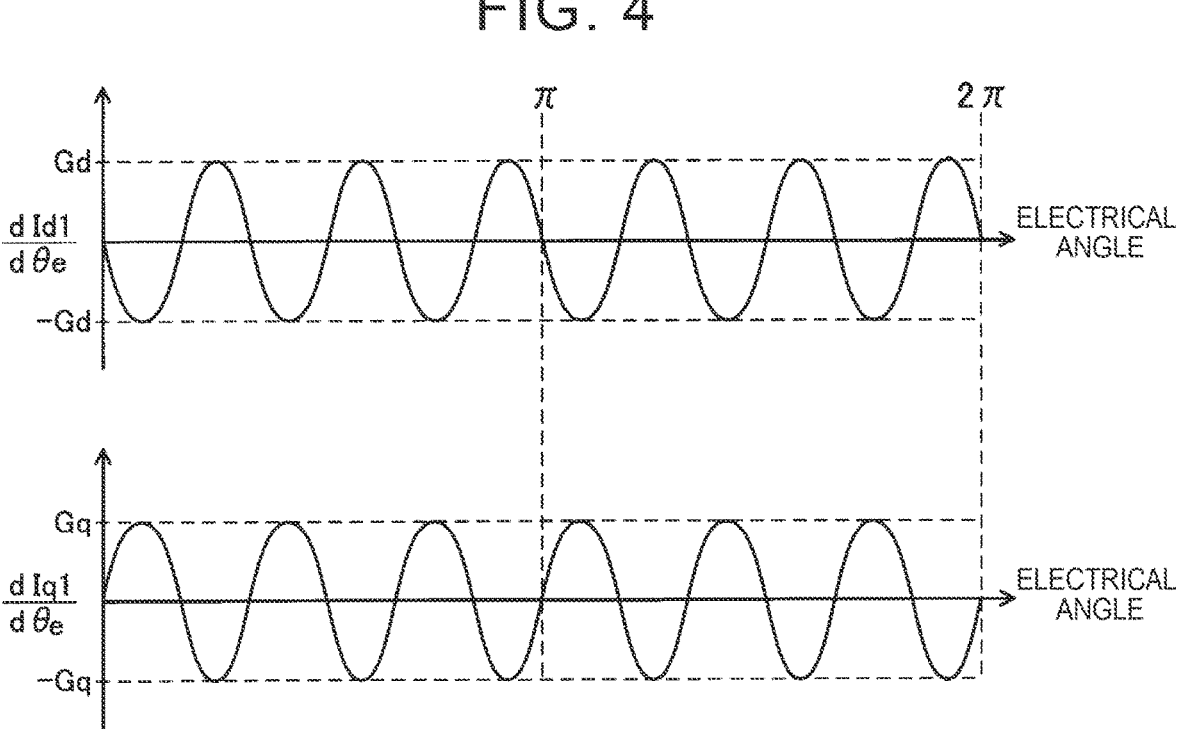
FIG. 3 is a graph of the d-axis correction value Id1 and the q-axis correction value Iq1.
FIG. 4 is a graph of electrical angle differential values for each of the d-axis correction value and the q-axis correction value.

In the motor control device 20 of the embodiment, a correction value is added to each of the d-axis current command value Id0 and the q-axis current command value Iq0 in order to suppress sixth-order noise. The correction value generation unit 203 in FIG. 2 generates the d-axis correction value Id1 and the q-axis correction value Iq1. A graph of the d-axis correction value Id1 and the q-axis correction value Iq1 is shown in FIG. 3. The horizontal axis of FIG. 3 is the electrical angle θe of the rotor, and the vertical axis is the gain of the correction value. The d-axis correction value Id1 and the q-axis correction value Iq1 are defined as functions of the electrical angle θe. The correction value gains Gd and Gq are set to values corresponding to the target torque Trc. Since the sixth-order noise is suppressed, the frequency of change over time of the d-axis correction value Id1 and the q-axis correction value Iq1 is a function of the frequency of change over time of the electrical angle θe.

Thus, the d-axis correction value Id1 and the q-axis correction value Iq1 for suppressing sixth-order noise are determined based on the electrical angle θe and the target torque Trc. The d-axis correction value Id1 and the q-axis correction value Iq1 are determined by functions of the electrical angle θe and the target torque Trc. The correction value generation unit 203 in FIG. 2 generates the d-axis correction value Id1 and the q-axis correction value Iq1 based on the electrical angle θe and the target torque Trc (based on the graph in FIG. 3).

An adder 211 adds the d-axis current command value Id0 and the d-axis correction value Id1. The adder 211 also adds the q-axis current command value Iq0 and the q-axis correction value Iq1. A total value (Id0+Id1) of the d-axis current command value Id0 and the d-axis correction value Id1 is referred to as a d-axis current correction command value. The total value (Iq0+Iq1) of the q-axis current command value Iq0 and the q-axis correction value Iq1 is called a q-axis current correction command value.

The d-axis current correction command value and the q-axis current correction command value are input to the feedforward section (FF unit 204a). In the FF unit 204a, (Id0+Id1) is substituted for Id and (Iq0+Iq1) is substituted for Iq in (Equation 1), and feedforward voltage command values (d-axis voltage command value Vdff and q-axis voltage command value Vqff) are obtained. The equations for obtaining the d-axis voltage command value Vdff and the q-axis voltage command value Vqff from the d-axis current correction command value (Id0+Id1) and the q-axis current correction command value (Iq0+Iq1) are the following (Equation 2) and (Equation 3).

$$Vdff = Vd0 + Vd1 \qquad \text{(Equation 2)}$$
$$= R \times (Id0 + Id1) + Ld \frac{d(Id0 + Id1)}{dt} -$$
$$\omega \times Lq \times (Iq0 + Iq1)$$

$$Vqff = Vq0 + Vq1$$
$$= R \times (Iq0 + Iq1) + Lq \frac{d(Iq0 + Iq1)}{dt} +$$
$$\omega \times Ld \times (Id0 + Id1) + \omega \times \Phi$$

$$Vd0 = R \times Id0 + Ld \frac{dId0}{dt} - \omega \times Lq \times Iq0 \qquad \text{(Equation 3)}$$

$$Vd1 = R \times Id1 + Ld \frac{dId1}{dt} - \omega \times Lq \times Iq1$$

$$Vq0 = R \times Iq0 + Lq \frac{dIq0}{dt} + \omega \times Ld \times Id0$$

$$Vq1 = R \times Iq1 + Lq \frac{dIq1}{dt} + \omega \times Ld \times Id1$$

A voltage command generation unit 204 generates a d-axis voltage command value Vd0+Vd1 using time differentiation of the d-axis current correction command value (Id0+Id1), and generates a q-axis voltage command value (Vq0+Vq1) using time differentiation of the q-axis current correction command value (Iq0+Iq1).

Three-phase currents Ius, Ivs, and Iws of the motor 6 measured by the current sensor 7 are input to the dq transform unit 208. The rotor angular velocity ω and electrical angle θe measured by the angle sensor 8 are also input to the dq transform unit 208. As described above, the angular velocity ω represents the time change of the electrical angle θe. A dq transform unit 208 dq transforms the three-phase currents Ius, Ivs, and Iws using the rotor angular velocity ω and electrical angle de to obtain d-axis current Ids and q-axis current Iqs. Since the dq transform is well known, the explanation is omitted.

A difference calculator 210 calculates the difference between the d-axis current correction command value (Id0+Id1) and the d-axis current Idr, and calculates the difference between the q-axis current correction command value (Iq0+Iq1) and the q-axis current Iqr. The difference is input to the feedback unit (FB unit 204b). The FB unit 204b generates a d-axis voltage command value Vdfb and a q-axis voltage command value Vqfb in feedback control based on general control measures such as PI control and PID control for the difference. Feedback control based on the difference is as described above.

The d-axis voltage command value Vdff by feedforward control and the d-axis voltage command value Vdfb by feedback control are added in adder 213 to obtain d-axis voltage final command value Vdc. The q-axis voltage command value Vqff by feedforward control and the q-axis voltage command value Vqfb by feedback control are added in adder 213 to obtain q-axis voltage final command value Vqc.

The d-axis voltage final command value Vdc and the q-axis voltage final command value Vqc are input to the dq inverse transform unit 206. The dq inverse transform unit 206 converts the d-axis voltage final command value Vdc and the q-axis voltage final command value Vqc into voltage command values Vuc, Vvc, and Vwc for each of the three phases using the angular velocity ω and the electrical angle θe.

The voltage command values Vuc, Vvc, and Vwc for each of the three phases are input to the drive signal generation unit 207. Drive signal generation unit 207 compares each of voltage command values Vuc, Vvc, and Vwc of each of the three phases with a carrier signal, and generates a drive signal (PWM signal) for driving inverter 220 (switching elements 5a to 5f). The generated drive signal (PWM signal) is sent to inverter 220. The motor 6 rotates by driving the inverter 220 with the drive signal.

The FF unit 204a and the FB unit 204b are collectively referred to as a voltage command generation unit 204. The voltage command generation unit 204 (FF unit 204a) generates the d-axis voltage command value Vdff based on the d-axis current correction command value (Id0+Id1) obtained by adding the d-axis correction value Id1 to the d-axis current command value Id0. Similarly, the voltage command generation unit 204 (FF unit 204a) generates the q-axis voltage command value Vqff based on the q-axis current correction command value (Iq0+Iq1) obtained by adding the q-axis correction value Iq1 to the q-axis current command value Iq0.

The voltage command generation unit 204 (FB unit 204b) further generates a d-axis voltage command value Vdfb based on the difference between the d-axis current correction command value (Id0+Id1) and the d-axis current Idr of the motor, and a q-axis voltage command value Vqfb based on the difference between the q-axis current correction command value (Iq0+Iq1) and the q-axis current Iqr of the motor. The voltage command generation unit 204 (adder 213) generates a d-axis voltage command value Vdff (a q-axis voltage command value Vqff) generated by the FF unit 204a and a d-axis voltage command value Vdfb (a q-axis voltage command value Vqfb) generated by the FB unit 204b to generate the d-axis voltage final command value Vdc and the q-axis voltage final command value Vqc.

A d-axis correction value Id1 and a q-axis correction value Iq1 that reduce sixth-order noise are used in the drive signal generation process. Therefore, the motor control device 20 can drive the motor 6 while suppressing sixth-order noise. The motor control device 20 (voltage command generation unit 204) particularly uses the time differentiation of the d-axis current correction command value to generate the d-axis voltage command value, and uses the time differentiation of the q-axis current correction command value to generate the q-axis voltage command value. By considering the time differentiation, the response characteristics of the motor control device 20 can be improved. In other words, the motor control device 20 can effectively suppress sixth-order noise even in the high rotation range of the motor.

As described with reference to FIG. 3, the d-axis correction value Id1 and the q-axis correction value Iq1 are determined as a function of the electrical angle θe. More specifically, the d-axis correction value Id1 is determined as a function of the target torque Trc and the electrical angle θe. The d-axis correction value Id1 and the q-axis correction value Iq1 are expressed by simple functions of the target torque Tre and the electrical angle θe. Therefore, the motor control device 20 can quickly determine the d-axis correction value Id1 and the q-axis correction value Iq1. As a result, the motor control device 20 can suppress sixth-order noise even while the motor is rotating at high speed.

(Equation 2) and (Equation 3) include time derivatives such as the d-axis current command value Id0 (q-axis current command value Iq0) and the d-axis correction value Id1 (q-axis correction value Iq1). The computer 200 may obtain the time differentiation of the d-axis current and the q-axis current by the following (Equation 4).

$$dId/dt = \{Id(\text{current value}) - Id(\text{previous value})\}/\text{control cycle} \quad \text{(Equation 4)}$$

$$dIq/dt = \{Iq(\text{current value}) - Iq(\text{previous value})\}/\text{control cycle}$$

The "current value" means the value obtained by the sensor in the current control cycle, and the "previous value" means the value obtained by the sensor in the previous control cycle. Time differentiation of the d-axis current or the like can be obtained easily (at high speed) by (Equation 4).

The d-axis voltage command correction value Vd1 and the q-axis voltage command correction value Vq1 in (Equation 3) can be modified as shown in (Equation 5) below.

$$\begin{aligned} Vd1 &= R \times Id1(\theta e) + Ld\frac{d\theta e}{dt}\frac{dId1(\theta e)}{d\theta e} - \omega \times Lq \times Iq1(\theta e) \quad \text{(Equation 5)} \\ &= R \times Id1(\theta e) + \omega\left\{Ld\frac{dId1(\theta)}{d\theta e} - Lq \times Iq1(\theta e)\right\} \end{aligned}$$

$$\begin{aligned} Vq1 &= R \times Iq1(\theta e) + Lq\frac{d\theta e}{dt}\frac{dIq1(\theta e)}{d\theta e} + \omega \times Ld \times Id1(\theta e) \\ &= R \times Iq1(\theta e) + \omega\left\{Lq\frac{dIq1(\theta)}{d\theta e} + Ld \times Id1(\theta e)\right\} \end{aligned}$$

In (Equation 5), Id1(θe) indicates that the d-axis correction value Id1 is a function of the electrical angle θe, and Iq1(θe) indicates that the q-axis correction value Iq1 is a function of the electrical angle θe. That is, Id1(θe) corresponds to the upper graph in FIG. 3, and Iq1(θe) corresponds to the lower graph in FIG. 3.

Also, in (Equation 5), (dθe/dt) represents the time differentiation of the electrical angle θe. The time derivative of the electrical angle δe is nothing but the angular velocity ω of the rotor. Therefore, the transformation from the first line to the second line and the transformation from the third line to the fourth line of (Equation 5) are established.

The d-axis correction value Id1 (q-axis correction value Iq1) is given by the graph in FIG. 3. Therefore, dId1/dθe (dIq1/dθe) becomes the graph in FIG. 4. The upper graph in FIG. 4 represents dId1/dθe, and the lower graph represents dIq1/dθe. Since the inside of the braces of (Equation 5) is a function of the electrical angle θe, it is also preferable to map the numerical values represented by the braces of (Equation 5) and store them in the computer 200.

Figure 5:
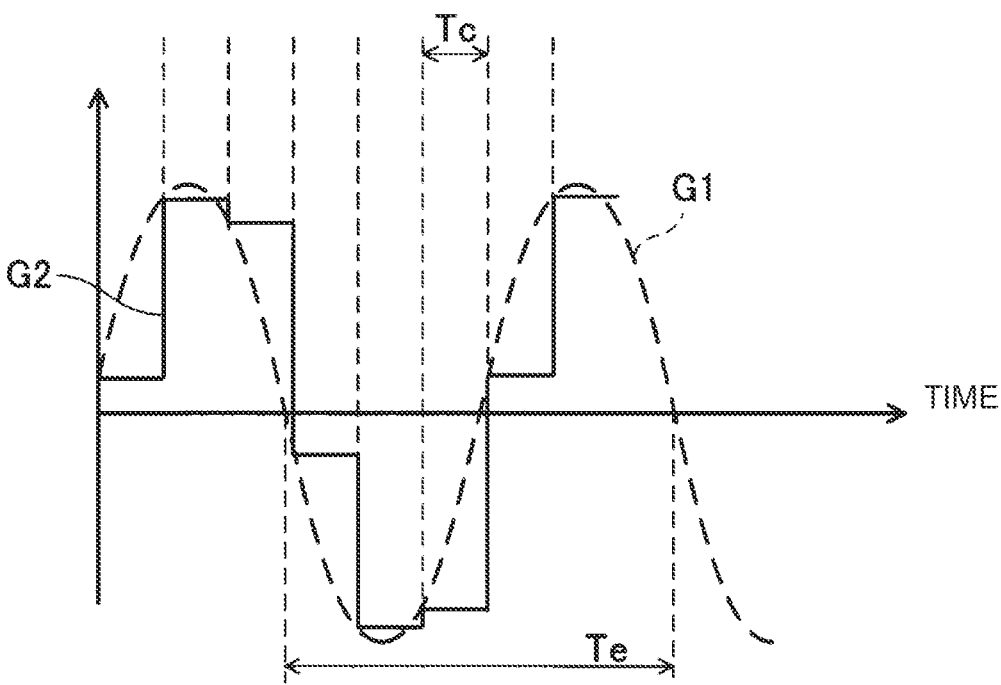
FIG. 5 is a graph of ideal voltage command values and actual voltage command values (without consideration of the delay angle).

Next, a case where the correction value generation unit 203 generates the d-axis correction value and the q-axis correction value in consideration of the delay dependent on the control period will be described. FIG. 5 shows a graph comparing the ideal voltage command value and the actual voltage command value (no consideration of delay). A dashed line graph G1 represents an ideal voltage command value, and a solid line graph G2 represents an actual voltage command value. A line graph G2 represents a voltage command value without consideration of a delay time (described later). Symbol Te in FIG. 5 indicates the period of change in the electrical angle θe, and symbol Tc indicates the control period of the motor control device 20.

The solid line graph G2 lags behind the dashed line graph G1 by half the control cycle Tc (Tc/2). When the solid line graph G2 is moved forward (to the left of the graph) by time Tc/2, the phase of the solid line graph G2 matches the phase of the dashed line graph G1. The period Te of change of the electrical angle $\theta e$ is $2\pi$ when converted into an angle (where "$\pi$" is the circular constant). Then, the angle $\theta d$ corresponding to Te/2 is $Ad=2\pi\times(Tc/2)\times(1/Te)=\pi\times Tc/Te$. Therefore, the correction value generation unit 203 generates the d-axis correction value Id1 and the q-axis correction value Iq1 based on the angle obtained by adding the delay angle $\theta d$ to the electrical angle de of the rotor of the motor 6.

The d-axis voltage command correction value Vd1 and the q-axis voltage command correction value Vq1 taking into consideration the delay angle $\theta d$ are calculated by the following (Equation 6). (Equation 6) is an equation obtained by substituting $\theta e+\theta d$ instead of $\theta e$ in (Equation 5).

$$Vd1 = R \times Id1(\theta e + \theta d) + \tag{Equation 6}$$
$$Ld\frac{d\theta e}{dt}\frac{dId1(\theta e + \theta d)}{d\theta e} - \omega \times Lq \times Iq1(\theta e + \theta d)$$
$$Vq1 = R \times Iq1(\theta e + \theta d) + Lq\frac{d\theta e}{dt}\frac{dIq1(\theta e + \theta d)}{d\theta e} +$$
$$\omega \times Ld \times Id1(\theta e + \theta d)$$

When the delay angle $\theta d$ ($=\pi\times Tc/Te$) is taken into account, the line graph G2 in FIG. 5 shifts to the left by (Tc/2). That is, the phase of the line graph and the phase of the dashed line graph G1 substantially match.

Note that the d-axis voltage command value Vd0 may be left as it is in the first equation of (Equation 3), or the delay angle may be considered. The q-axis voltage command value Vq0 may also be the third equation of (Equation 3) as it is, or the delay angle may be considered. A d-axis voltage command value Vd0 and a q-axis voltage command value Vq0 that take into account the delay angle $\theta f$ are expressed by the following (Equation 7).

$$Vd0 = R \times Id0(\theta e + \theta f) + \tag{Equation 7}$$
$$Ld\frac{d\theta e}{dt}\frac{dId0(\theta e + \theta f)}{d\theta e} - \omega \times Lq \times Iq0(\theta e + \theta f)$$
$$Vq0 = R \times Iq0(\theta e + \theta f) + Lq\frac{d\theta e}{dt}\frac{dIq0(\theta e + \theta f)}{d\theta e} +$$
$$\omega \times Ld \times Id0(\theta e + \theta f)$$

The delay angle $\theta f$ may be the same as or different from the delay angle $\theta d$. The delay of switching elements 5a-5f of inverter 220 (switching delay) may be taken into consideration in determining delay angle $\theta d$ (and/or delay angle $\theta f$). For example, when the switching delay time is Ts, the delay angle $\theta d$ may be determined by the equation $\theta d=\pi\times(Tc+Ts)/Te$.

Determining the delay angle $\theta d$ (and/or the delay angle $\theta f$) may take into account the frequency of the carrier signal. Further, the frequency of the carrier signal, the control cycle Tc, and the degree of contribution to the switching delay may be changed for each of the d-axis voltage command correction value Vd1 and the q-axis voltage command correction value Vq1. Also, the d-axis voltage command correction value Vd1 and the q-axis voltage command correction value Vq1 may be made dependent on the angular velocity $\omega$ of the motor 6.

Also, as shown in (Equation 6), the d-axis voltage command correction value Vd1 and the q-axis voltage command correction value Vq1 are functions of the electrical angle $\theta e$ and the delay angle $\theta d$. The delay angle $\theta d$ when determining the d-axis voltage command correction value Vd1 and the q-axis voltage command correction value Vq1 included in the input value to the FF unit 204a in FIG. 2 may be different from the delay angle $\theta d$ used when determining the d-axis voltage command correction value Vd1 and the q-axis voltage command correction value Vq1 included in the input value to the FB unit 204b in FIG. 2. The same applies to the delay angle $\theta f$.

Although the specific examples of the present disclosure have been described in detail above, these are merely examples and do not limit the scope of claims. The techniques described in the claims include various modifications and alternations of the specific example illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A motor control device comprising:

an inverter that produces three-phase alternating current to drive a motor;

a current command generation unit that generates a d-axis current command value and a q-axis current command value from a target torque of the motor;

a correction value generation unit that generates a d-axis correction value and a q-axis correction value that suppress noise having a frequency six times as high as a frequency of change in an electrical angle of the motor, based on the target torque and the electrical angle;

a voltage command generation unit that generates a d-axis voltage command value based on a d-axis current correction command value obtained by adding the d-axis correction value to the d-axis current command value, and generates a q-axis voltage command value based on a q-axis current correction command value obtained by adding the q-axis correction value to the q-axis current command value;

a dq inverse transform unit that generates voltage command values for respective three phases from the d-axis voltage command value and the q-axis voltage command value; and a drive signal generation unit that generates a drive signal of the inverter from the voltage command values for the respective three phases, wherein:

the voltage command generation unit generates the d-axis voltage command value based on a difference between the d-axis current correction command value and a d-axis current of the motor;

the voltage command generation unit generates the q-axis voltage command value based on a difference between the q-axis current correction command value and a q-axis current of the motor;

the voltage command generation unit generates the d-axis voltage command value using time differentiation of the d-axis current correction command value; and the voltage command generation unit generates the q-axis voltage command value using time differentiation of the q-axis current correction command value.

2. The motor control device according to claim 1, wherein the d-axis correction value and the q-axis correction value are each determined as a function of the electrical angle.

3. The motor control device according to claim 1, wherein the correction value generation unit generates the d-axis correction value and the q-axis correction value based on an angle obtained by adding a predetermined delay angle to the electrical angle.

4. The motor control device according to claim 3, wherein the delay angle is π×Tc/Te, where π is a circular constant, Tc is a control cycle of the motor control device, and Te is a cycle of change in the electrical angle.

\* \* \* \* \*